United States Patent
Osborn et al.

(10) Patent No.: US 12,370,994 B2
(45) Date of Patent: Jul. 29, 2025

(54) APPARATUS AND METHOD FOR EVACUATION OF A BRAKE SYSTEM

(71) Applicant: ZF Active Safety US Inc., Livonia, MI (US)

(72) Inventors: Douglas Osborn, Livonia, MI (US); Daniel L. Hopper, Bay Village, OH (US)

(73) Assignee: ZF Active Safety US Inc., Livonia, MI (US)

( * ) Notice: Subject to any disclaimer, the term of this patent is extended or adjusted under 35 U.S.C. 154(b) by 0 days.

(21) Appl. No.: 18/512,213

(22) Filed: Nov. 17, 2023

(65) Prior Publication Data

US 2025/0162565 A1    May 22, 2025

(51) Int. Cl.
| | |
|---|---|
| *B60T 17/22* | (2006.01) |
| *B60T 13/68* | (2006.01) |
| B60T 13/66 | (2006.01) |
| B60T 13/72 | (2006.01) |
| B60T 13/74 | (2006.01) |

(52) U.S. Cl.
CPC .......... *B60T 17/222* (2013.01); *B60T 13/686* (2013.01); *B60T 13/662* (2013.01); *B60T 13/72* (2013.01); *B60T 13/745* (2013.01)

(58) Field of Classification Search
CPC ..... B60T 17/222; B60T 13/686; B60T 13/745
See application file for complete search history.

(56) References Cited

U.S. PATENT DOCUMENTS

| | | | | |
|---|---|---|---|---|
| 5,538,335 | A * | 7/1996 | Saito | F04B 53/1002 303/113.1 |
| 5,743,600 | A * | 4/1998 | Yasuda | B60T 8/32 303/113.1 |
| 10,857,988 | B2 * | 12/2020 | Jeong | B60T 13/146 |
| 11,097,710 | B2 * | 8/2021 | Anderson | B60T 17/004 |
| 11,332,108 | B2 * | 5/2022 | Albert | B60T 17/222 |
| 12,115,963 | B2 * | 10/2024 | Ganzel | B60T 13/58 |
| 2017/0158180 | A1 * | 6/2017 | Kim | B60T 13/146 |
| 2021/0237701 | A1 | 8/2021 | Albert | |

* cited by examiner

*Primary Examiner* — Dustin T Nguyen
(74) *Attorney, Agent, or Firm* — Tarolli, Sundheim, Covell & Tummino LLP (57) ABSTRACT

A method of operating a vehicle brake system having multiple wheel brakes includes providing a plunger assembly having a plunger and a chamber fluidly connected to at least one of the wheel brakes. An evacuation of at least one of the wheel brakes is performed by moving the plunger relative to the chamber under control of an electronic control unit (ECU) to generate a vacuum from the chamber to the at least one wheel brake. Pressurized brake fluid is supplied from a reservoir to the evacuated wheel brakes by moving the plunger relative to the chamber under control of the ECU once all the wheel brakes are evacuated.

18 Claims, 8 Drawing Sheets

APPARATUS AND METHOD FOR EVACUATION OF A BRAKE SYSTEM

TECHNICAL FIELD

This invention relates to brake systems and, in particular, relates to a brake system configured to simultaneously evacuate multiple wheels brakes.

BACKGROUND

A brake system may include a plurality of wheel brakes and a hydraulic braking pressure generator, a braking pressure modulator which is provided in the pressure fluid conduits between the braking pressure generator and the wheel brakes and which serves to vary the braking pressure by changing the volume of a chamber containing the hydraulic fluid, sensors for determining the wheel rotational behavior, and electronic circuits for processing the sensor signals and for generating braking-pressure control signals. Brake systems may also include an electronic control unit that can be used to provide a braking command to the wheel brakes, autonomously and/or manually (e.g., via the use of an operator-manipulable brake pedal). With this in mind, it can be desirable to evacuate/bleed portions of the brake system prior to vehicle operation in order to remove air bubbles or the like from the brake fluid paths and increase the efficacy/efficiency of the braking process.

SUMMARY

In one example, a method of operating a vehicle brake system having multiple wheel brakes includes providing a plunger assembly having a plunger and a chamber fluidly connected to at least one of the wheel brakes. An evacuation of at least one of the wheel brakes is performed by moving the plunger relative to the chamber under control of an electronic control unit (ECU) to generate a vacuum from the chamber to the at least one wheel brake. Pressurized brake fluid is supplied from a reservoir to the evacuated wheel brakes by moving the plunger relative to the chamber under control of the ECU once all the wheel brakes are evacuated.

In another example, a method of operating a vehicle brake system having multiple wheel brakes includes providing a dual acting plunger assembly having a plunger and defining a first chamber connected to a reservoir filled with brake fluid and a second chamber connected to the wheel brakes. A dump valve associated with each wheel brake is placed in an open condition to place each wheel brake in fluid communication with the first chamber. An auto-fill valve positioned between the reservoir and the first chamber is placed in a closed condition to prevent fluid communication between the first chamber and the reservoir. The plunger is moved in the reciprocating manner multiple times to simultaneously pressure bleed all the wheel brakes.

BRIEF DESCRIPTION OF THE DRAWINGS

For a better understanding, reference may be made to the accompanying drawings, in which.

DETAILED DESCRIPTION

Figure 1:
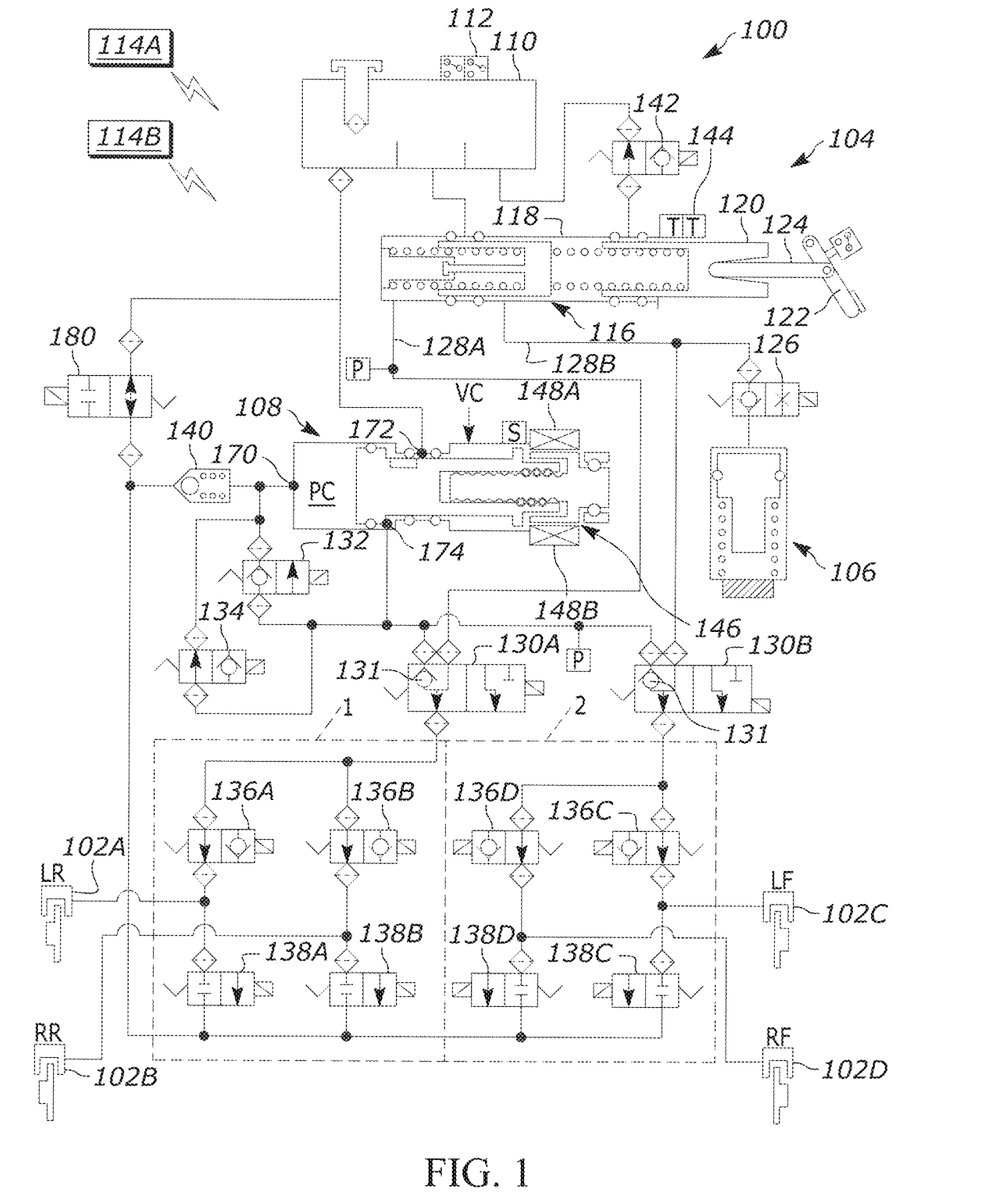
FIG. 1 is a schematic hydraulic diagram of a brake system according to an aspect of the present invention.

This invention relates to brake systems and, in particular, relates to a brake system configured to simultaneously evacuate multiple wheels brakes. FIG. 1 depicts an example brake system 100 for actuating a pair of front wheel brakes and a pair of rear wheel brakes, in a first configuration. The brake system 100 is shown in FIG. 1 as a hydraulic brake-by-wire system in which electronically controlled fluid pressure is utilized to apply braking forces for the brake system 100.

The brake system 100 may suitably be used on a ground vehicle, such as an automotive vehicle having four wheels with a wheel brake associated with each wheel. Furthermore, the brake system 100 can be provided with other braking functions such as anti-lock braking (ABS) and other slip control features to effectively brake the vehicle. Components of the brake system 100 may be housed in one or more blocks or housings. The block or housing may be made from solid material, such as aluminum, that has been drilled, machined, or otherwise formed to house the various components. Fluid conduits may also be formed in the block or housing.

In the illustrated embodiment of the brake system 100, there are four wheel brakes 102A, 102B, 102C, and 102D. The wheel brakes 102A, 102B, 102C, and 102D can have any suitable wheel brake structure operated electrically and/or by the application of pressurized brake fluid. Each of the wheel brakes 102A, 102B, 102C, and 102D may include, for example, a brake caliper mounted on the vehicle to engage a frictional element (such as a brake disc) that rotates with a vehicle wheel to effect braking of the associated vehicle wheel.

The wheel brakes 102A, 102B, 102C, and 102D can be associated with any combination of front and rear wheels of the vehicle in which the brake system 100 is installed. For example, the brake system 100 may be configured as a front/rear split system, as shown, such that a first pressure circuit (indicated by dashed line "1" in FIG. 1) is associated with providing fluid to one or both of the rear wheel brakes 102A and 102B.

A second pressure circuit (indicated by dashed line "2" in FIG. 1) may be associated with providing fluid to one or both of the front wheel brakes 102C and 102D. It is contemplated that any of the wheel brakes 102 referenced herein as being hydraulically operated may also or instead be electrically operated, such as by including at least one rear wheel brake motor (not shown) for selectively electrically actuating parking and/or service brakes, for some use environments of the brake system 100.

In this example, the wheel brake 102A may be associated with a left rear wheel of the vehicle in which the brake system 100 is installed, and the wheel brake 102B may be associated with the right rear wheel. The wheel brake 102C may be associated with the left front wheel, and the wheel brake 102D may be associated with the right front wheel. Alternatively, though not depicted here, the brake system 100 may be configured as a diagonal split brake system such that the wheel brakes 102A and 102B are associated with wheels at diagonal corners of the vehicle, and the wheel brakes 102C and 102D are associated with wheels on the other diagonal corners of the vehicle.

The brake system 100 generally includes a brake pedal unit, indicated generally at 104, a pedal simulator, indicated generally at 106, a power transmission unit (also known as a dual acting plunger ("DAP") or a plunger assembly in some configurations), indicated generally at 108, and a fluid reservoir 110. The reservoir 110 stores and holds hydraulic fluid for the brake system 100. The fluid within the reservoir 110 is preferably held at or about atmospheric pressure, but the fluid may be stored at other pressures if desired.

The reservoir 110 is shown schematically having three tanks or sections with fluid conduit lines connected thereto. The sections can be separated by several interior walls within the reservoir 110 and are provided to prevent complete drainage of the reservoir 110 in case one of the sections is depleted due to a leakage via one or more of the three lines connected to the reservoir 110. Alternatively, the reservoir 110 may include multiple separate housings. The reservoir 110 may include at least one fluid level sensor 112 (two shown, for redundancy) for detecting the fluid level of one or more of the sections of the reservoir 110.

The power transmission unit 108 of the brake system 100 functions as a source of pressure to provide a desired pressure level to the wheel brakes 102A, 102B, 102C, and 102D during a typical or normal non-failure brake apply. After a brake apply, fluid from the hydraulically operated ones of the wheel brakes 102A, 102B, 102C, and 102D may be returned to the power transmission unit 108 and/or diverted to the reservoir 110. In the depicted embodiment, the power transmission unit 108 is a dual acting plunger assembly configured to also provide boosted pressure to the brake system 100 when a piston of the power transmission unit 108 is stroked rearwardly as well as forwardly.

It is also contemplated that a configuration (not shown) of the brake system 100 could include hydraulic control of only two wheels, with the remaining wheels being electrically controlled/actuated. One of ordinary skill in the art would be readily able to provide such an arrangement for a desired use environment, following aspects of the present invention.

Regardless of the specific configuration, though, the power transmission unit 108 is configured for selectively providing pressurized hydraulic fluid for actuating at least a selected one of the wheel brakes 102 in a boosted braking mode during a braking event.

The brake system 100 also includes at least one electronic control unit ("ECU") 114. As shown and described herein, two separate ECUs 114A, 114B are provided, for redundancy. Alternatively, only one ECU 114 (not shown) is provided for the brake system 100. Each ECU 114 may include microprocessors and other electrical circuitry. Each ECU 114 receives various signals, processes signals, and controls operation of various electrical components of the brake system 100 in response to processing the received signals. Each ECU 114 can be connected to various sensors such as the reservoir fluid level sensor 112, pressure sensors, travel sensors, switches, wheel speed sensors, and steering angle sensors. Each ECU 114 may also be connected to an external module (not shown) for receiving information related to yaw rate, lateral acceleration, longitudinal acceleration of the vehicle, or other characteristics of vehicle operation for any reason, such as, but not limited to, controlling the brake system 100 during vehicle braking, stability operation, or other modes of operation.

Additionally, each ECU 114 may be connected to the instrument cluster for collecting and supplying information related to warning indicators such as an ABS warning light, a brake fluid level warning light, and a traction control/vehicle stability control indicator light. The electronic control units 114A, 114B are provided, in the configuration of the brake system 100 shown in FIG. 1, for controlling at least one of the power transmission unit 108 and the first and second pressure circuits.

As shown schematically in FIG. 1, the brake pedal unit 104 includes a master cylinder 116 with a housing 118 for slidably receiving various cylindrical pistons and other components therein. Note that the housing is not specifically schematically shown in the Figures, but instead the walls of the longitudinally extending bore are schematically illustrated. The housing 118 may be formed as a single unit or include two or more separately formed portions coupled together. An input piston 120 is connected with a brake pedal 122 via a linkage arm 124. Leftward movement of the input piston 120 may cause, under certain conditions, a pressure increase within the master cylinder 116. In the brake system 100 shown in FIG. 1, the master cylinder 116 can be used to provide a manual push through mode, during predetermined phases of operation of the brake system 100, on a routine and/or acute event basis.

The brake pedal unit 104 is connected to the brake pedal 122 and is actuated by the driver of the vehicle as the driver presses on the brake pedal 122. A brake sensor or switch 144 may be electrically connected to the ECU 114 to provide a signal indicating a depression of the brake pedal 122. The pedal simulator 106, when present, provides a comfortable and expected "feel" to the brake pedal 122 motion for the driver and is hydraulically connected to the master cylinder 116 via the pedal simulator valve 126.

The brake pedal unit 104 may be used as a back-up source of pressurized fluid to essentially replace the normally supplied source of pressurized fluid from the power transmission unit 108 under certain failed conditions of the brake system 100, and/or upon initial startup of the brake system 100. This situation is referred to as a manual push-through event, or a "manual apply". In the brake system 100 shown in FIG. 1, manual push-through may be accomplished for one pair of wheel brakes 102 only (usually for the pair of front wheel brakes 102C, 102D for vehicle weight distribution and weight transfer during braking reasons), or for all four wheel brakes 102 (i.e., the pair of front wheel brakes 102C, 102D and the pair of rear wheel brakes 102A, 102B).

The brake pedal unit 104 can supply pressurized fluid to a master cylinder output 128, which is then routed to the hydraulically operated ones of the wheel brakes 102A, 102B, 102C, and 102D as desired. In the brake system 100 shown in FIG. 1, two master cylinder outputs 128A, 128B are provided, for supplying push through hydraulic pressure to the first and second pressure circuits, respectively. This flow is pushed through, largely under mechanical pressure upon the brake pedal 122 from the driver's foot, from the master cylinder 116. That is, the master cylinder 116 is operable during a manual push-through mode by actuation of the brake pedal 122 connected to the master cylinder 116 to generate brake actuating pressure at first and second outputs 128A, 128B for hydraulically actuating at least a selected one of a pair of front wheel brakes 102C, 102D and a pair of rear wheel brakes 102A, 102B during the manual push-through mode.

The power transmission unit 108 is configured for selectively providing pressurized hydraulic fluid for actuating the pair of front wheel brakes 102C and 102D and the pair of rear wheel brakes 102A and 102B during a braking event. A two-position three-way valve 130 is hydraulically connected with the master cylinder 116 and the power transmission unit 108 and, as shown in FIG. 1, is hydraulically connected with a selected pair of the rear wheel brakes 102A, 102B or the front wheel brakes 102C and 102D. As shown in FIG. 1, first and second three-way valves 130A, 130B are provided, for actuation of the first and second pressure circuits, respectively. The three-way valves 130A, 130b are normally closed such that the default or de-energized condition of the valve fluidly connects the power transmission unit 108 to the master cylinder 116 when a predetermined fluid pressure overcomes an internal check valve 131 in the three-way valve. The energized/actuated conditions of the three-way valves 130A, 130B control hydraulic fluid flow from a chosen one of the master cylinder 116 and the power transmission unit 108 to a respective one of the pair of front wheel brakes 102B and 102D and the pair of rear wheel brakes 102A and 102C.

Through use of the three-way valves 130A, 130B, hydraulic fluid can be routed to the respective pair of front wheel brakes 102C/102D and/or rear wheel brakes 102A/102B in a desired manner (from a chosen one of the master cylinder 116 or the power transmission unit 108) to assist with boosted braking control and provide desired response times and efficient pressure flow to the wheel brakes 102. Stated differently, the three-way valves 130A, 130B are configured to selectively switch the brake system 100 between manual push-through mode and boosted braking mode.

A normally-closed dual-acting plunger ("DAP") valve 132 and a normally-open DAP valve 134 are located fluidically between the power transmission unit 108 and at least one of the three-way valves 130A, 130B.

An isolation valve 136 and a dump valve 138 are associated with each wheel brake of the pair of front wheel brakes 102C, 102D and the pair of rear wheel brakes 102A, 102B. (The isolation valves 136 and dump valves 138 are labeled in the Figures with a suffixed "A", "B", "C", or "D" to indicate the corresponding one of the wheel brakes 102 with which each is associated). The isolation valves 136 are located hydraulically between their respective wheel brake 102 and the power transmission unit 108, and specifically as shown in FIG. 1, between their respective wheel brake 102 and the respective three-way valve 130A, 130B. The dump valves 138 are located hydraulically between their respective wheel brake 102 and the reservoir 110.

FIG. 1 also depicts a replenishing check valve 140, which is located fluidically between the reservoir 110 and the power transmission unit 108. When present, the replenishing check valve 140 may be provided to assist with refilling of the power transmission unit 108 (or components thereof) under predetermined conditions. For example, the replenishing check valve 140 may help facilitate refilling of the chamber in front of the DAP head when the DAP-type power transmission unit 108 is building pressure during its retraction stroke (normally closed DAP valve 132 de-energized and normally open DAP valve 134 energized) by pushing fluid out of the annular chamber behind the DAP head. This is done, for example, during slip control if additional flow to the brakes is needed after the DAP is stroked fully forward.

A simulator test valve 142 may be provided between the brake pedal unit 104 and the reservoir 110.

As mentioned above, the brake pedal 122 is connected to the brake pedal unit 104 and selectively actuated by a driver of the vehicle to indicate a desired braking command. The brake pedal unit 104 includes a travel sensor 144 (here, a redundant travel sensor) for determining a position of the brake pedal 122 and responsively producing a braking signal corresponding to the desired braking command. One or more pressure sensors (not shown) elsewhere in the brake system 100 could also or instead be used to measure or infer brake pedal force, such as, but not limited to, a pressure sensor operatively coupled to a portion of the master cylinder 116.)

In this brake system 100, the power transmission unit 108 includes an electric motor 146 for selectively actuating a fluid pressurization cycle of the power transmission unit 108. Here, the electric motor 146 is a dual-wound electric motor having first and second windings, depicted schematically at 148A and 148B of FIG. 1. The first ECU 114A selectively controls the first windings 148A of the electric motor 146 of the power transmission unit 108. The second ECU 114B selectively controls the second windings 148B of the electric motor 146 of the power transmission unit 108. It will be appreciated that in a single ECU 114 configuration said single ECU will control all the winding(s) 148 of the motor 146.

It will be understood by one of ordinary skill in the art that the "first and second windings", as referenced herein, could each include one or more individual windings. For example, an example implementation of the brake system 100 may include a "dual wound" electric motor 146 including two or more integrated three phase brushless DC motors. Each phase uses multiple windings that are connected together, typically via a lead frame with bus bars but other connection schemes are contemplated. For brevity and completeness, the "first windings" or "second windings", as referenced herein, respectively encompasses a "first winding or set of windings" or "second winding or set of windings", as desired for a particular use environment of the brake system 100.

Through use of a dual-wound electric motor such as that shown at 146—having any desired number of windings separated into the described first and second windings 148A and 148B, as just mentioned-a single power transmission unit 108 can be controlled by one or both of the ECUs 114A, 114B, thus facilitating use in a redundant "fault-tolerant" manner.

That is, if one of the ECUs 114A, 114B were to fail, the other ECU 114A, 114B could still be used to control the respective windings 148 of the electric motor 146 and preserve the ability of the power transmission unit 108 to provide pressurized hydraulic fluid to the first and second pressure circuits. Accordingly, the braking signal is transmitted from the travel sensor 144 to at least one of the first and second electronic control units 114A, 114B, and the at least one of the first and second ECUs 114A, 114B controls a respective first and/or second windings 148A, 148B of the power transmission unit 108 responsive to the braking signal.

The braking signal may be transmitted wired or wirelessly to the first and/or second electronic control units 114A, 114B, and the first and second electronic control units 114A, 114B may in turn control any other components of the brake system 100 in a wired or wireless manner, with a wireless control by the ECUs 114A, 114B being depicted schematically in the Figures, for simplicity.

It is contemplated that a selected one of the ECUs 114A, 114B could be a "master" ECU, as desired, with the other of the ECUs 114A, 114B providing a "backup" or "secondary" control of the brake system 100, or that both of the ECUs 114A, 114B could be used concurrently to control various parts of the brake system 100 during normal, non-failure operation.

In the brake system 100 shown in FIG. 1, one or more of the normally closed and normally open DAP valves 132, 134, the isolation valves 136, the dump valves 138, replenishing check valve 140, and/or the three-way valves 130A, 130B could also be of a dual-wound type, including first and second valve windings. When one or more of these or other system valves is of a dual-wound type, the first electronic control unit 114A may control the first valve windings and the second electronic control unit 114B may control the second valve windings, as desired for normal operation and/or emergency/redundancy purposes.

To reduce cost and complexity in the brake system 100, it is contemplated that only a portion of the system valves may be of the dual-wound type, and instead the first ECU 114A could control some remaining subset of single-wound system valves (e.g., the isolation and dump valves 136, 138 of the first pressure circuit) while the second ECU 114B could control another remaining subset of single-wound system valves (e.g., the isolation and dump valve 136, 138 of the second pressure circuit). When single-wound system valves are provided, it will be understood that they may be configured to be normally open or normally closed in such a way to optimize performance of the brake system 100 even if one of the first and second ECUs 114A, 114B is intentionally or accidentally deactivated.

Figure 2:
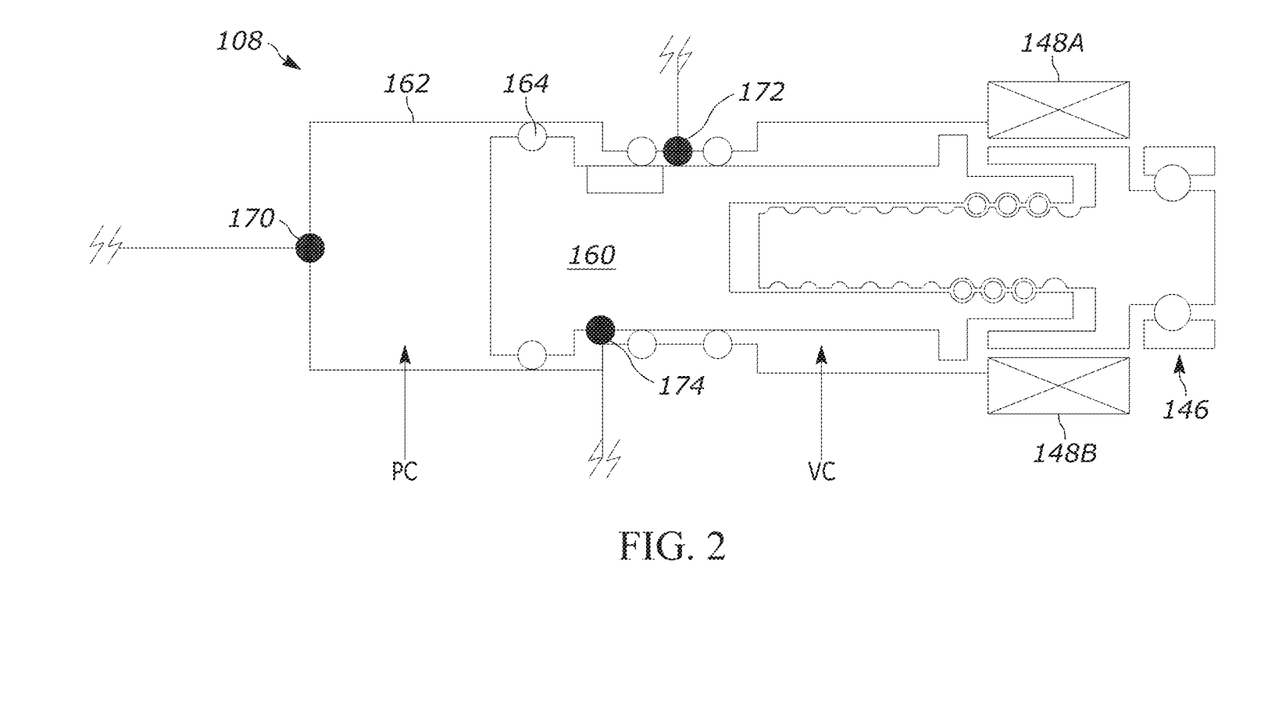
FIG. 2 is a schematic illustration of a dual acting plunger of the vehicle brake system of FIG. 1.

FIG. 2 illustrates one example dual acting plunger assembly 108 in more detail. The plunger assembly 108 includes a plunger or plunger rod 160 slidably received in a housing 162. An annular seal 164 on the plunger 160 defines an interface with the interior of the housing 162 to define a primary chamber PC and a vacuum chamber VC on either side of the seal. The chambers PC, VC are fluidly isolated from one another. In one example, the primary chamber PC has a large volume than the vacuum chamber VC.

The housing 162 defines or is connected to an outlet 170 in fluid communication with the primary chamber PC. The outlet 170, in turn, is fluidly connected to the reservoir 110 and therefore can be used for refilling or replenishing the primary chamber PC. With this in mind, the primary chamber PC-though the outlet 170—is coupled through a switchable valve 180 (e.g., electrically operable "auto-fill valve") to the reservoir 110 (see FIG. 1). The auto-fill valve 180 can be normally-open and electrically openable by either ECU 114A, 114B.

The housing 162 also defines or is connected to a pair of backside ports or outlets 172, 174 in fluid communication with the vacuum chamber VC. The backside port 172 is fluidly connected to the reservoir 110 for refilling or replenishing the vacuum chamber VC. The backside port 174 is fluidly connected to the dump valves 138 via the three-way valves 130A, 130B. As such, the wheel brakes 102 are fluidly coupled to the reservoir 110 through the vacuum chamber VC of the plunger assembly 108 such that no valve open/close needed. At the same time, the dump valves 138 and the associated wheel brakes 102 can be fluidly coupled to the reservoir 110 through the pressure chamber PC of the plunger assembly 108 in the event that the auto-fill valve 180 is in the open condition The selectively closable auto-fill valve 180 enables a circuit fill operation to be completed as described herein. Advantageously, the valve 180 enables all four wheel brakes 102 to be simultaneously evacuated/bled and then simultaneously filled rather than sequentially or individually bleeding then filling each wheel brake. The circuit fill operation can be completed at the time of vehicle assembly when the brake system 100 is newly installed and brake fluid has yet to be disseminated through all the fluid channels, e.g., all the lines, valves, ports, etc., of the circuit.

During the circuit filling, circuit bleeding is also achieved. This step is desirable to help ensure the circuit supplying the wheel cylinders 102 is full of brake fluid and substantially bled of trapped gases such as air. As described below, the circuit fill operation can be entirely self-contained and conducted under the command of the ECU 114A. For example, the filling and bleeding of all four wheel brakes 102 is achieved without extraneous tools or equipment, and is achieved with the system access points, e.g., reservoir cap, wheel cylinder bleed ports, remaining closed.

The circuit filling operation can be a relatively autonomous action of the brake system 100 that requires no process planning or assembly line actions on the part of the vehicle manufacturer. The circuit filling operation can commence automatically when initially power-enabled by connection to an electrical source. Alternately, the circuit filling operation can commence in response to detection of a designated signal provided in response to an initialization scenario, which is either a predetermined time or condition, or provided directly by a programming command from the vehicle manufacturer, e.g., provided in the final vehicle assembly phase through the vehicle's main ECU.

Figure 3:
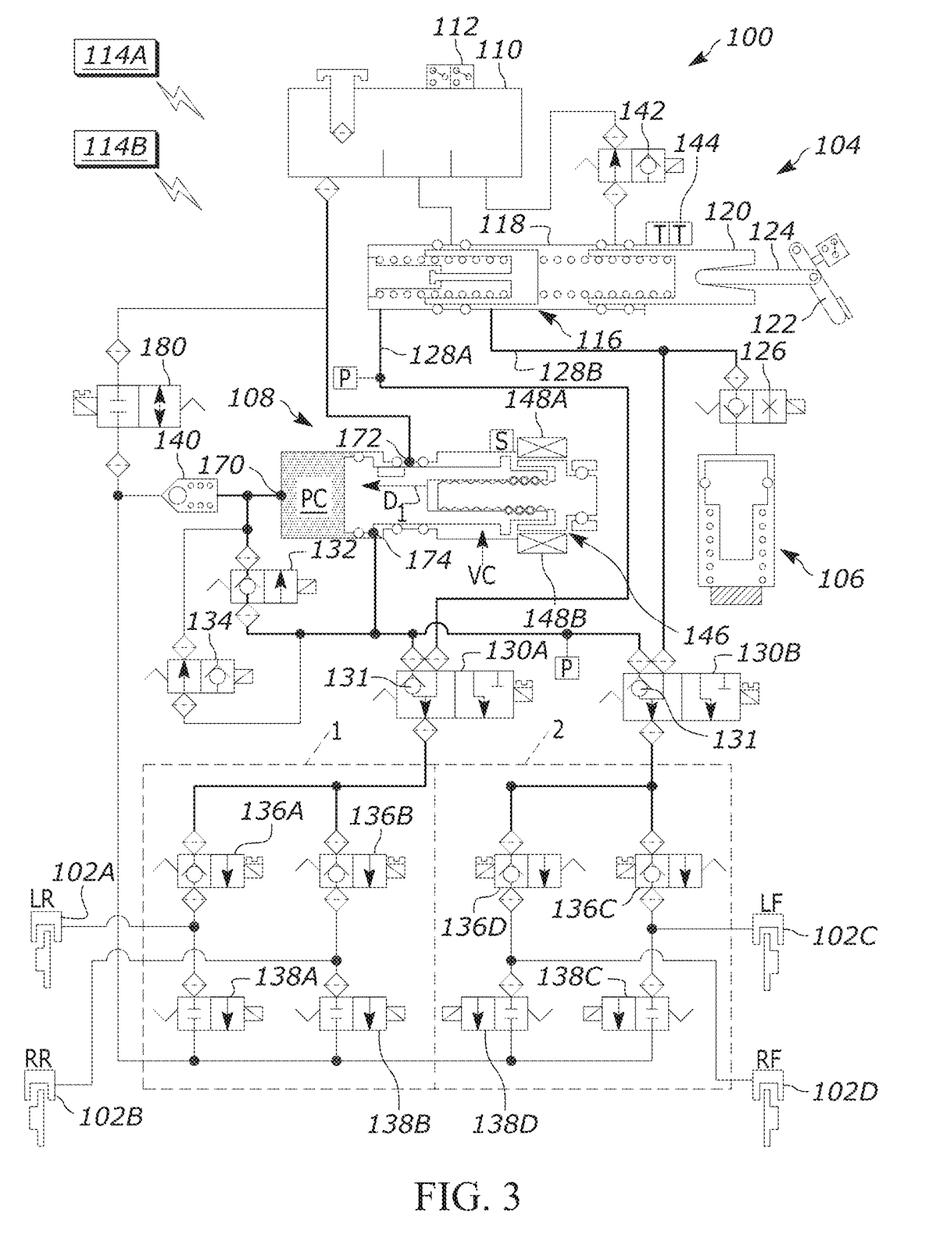
FIG. 3 is a schematic hydraulic diagram of the vehicle brake system during a power bleed operation.
Figure 4:
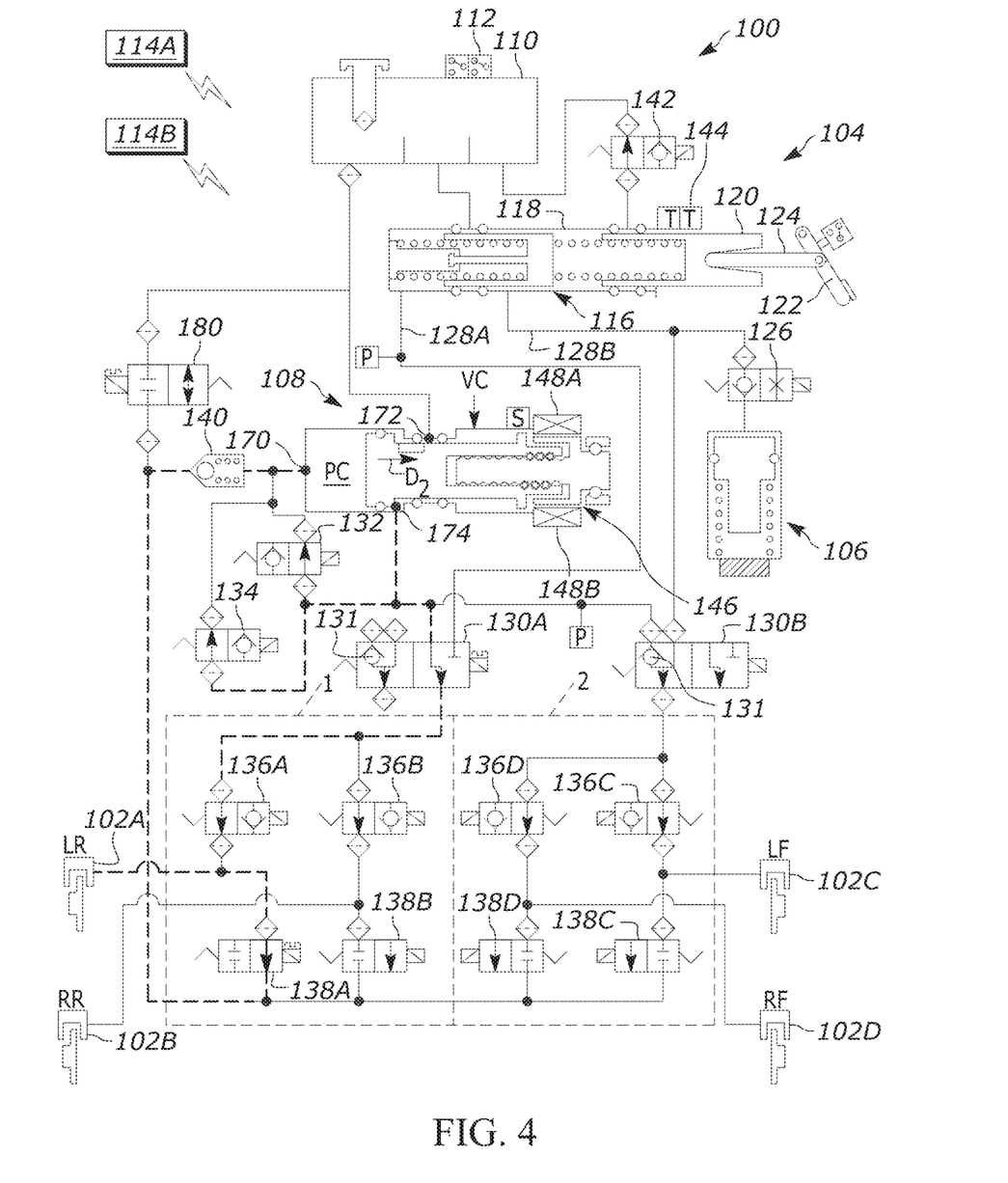
FIG. 4 is a schematic hydraulic diagram of the vehicle brake system during wheel brake evacuation operation.
Figure 5:
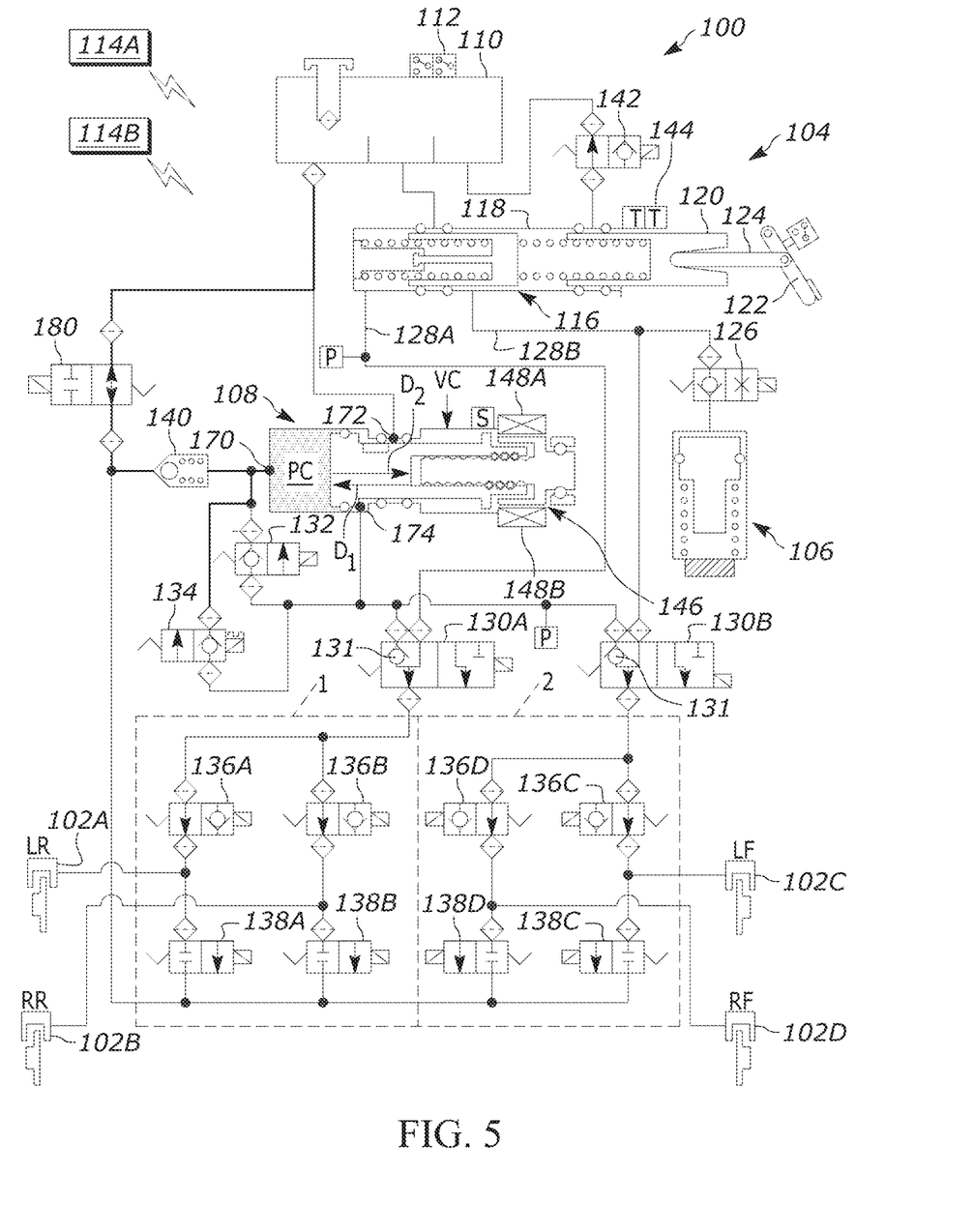
FIG. 5 is a schematic hydraulic diagram of the vehicle brake system during a power transmission unit filling operation.

The process of FIGS. 3-5 begins from a state in which the reservoir 110 has been filled with brake fluid. At the time of filling, all system valves may be in their at-rest or biased positions. Although some of the brake fluid may at least partially fill some of the fluid channels, further action is required to ensure that the entire unit is full and bled. As shown in FIG. 3, the first step of the circuit fill operation is a pressure circuit power bleed that includes advancing the plunger 160 towards the outlet 170 in the direction $D_1$ (known as a power stroke). Before the plunger 160 is advanced in the direction $D_1$, the three-way valves 130A, 130B are de-energized to the positions shown to allow fluid communication between the pressure chamber PC and master cylinder 116. It will be appreciated that in the de-energized position, a check valve 131 controls fluid communication between the downstream and upstream sides of each three-way valve 130A, 130B. In other words, the check valves 131 control fluid flow from the pressure chamber PC to the master cylinder 116 and can therefore be configured to open at a predetermined or "pop-off" pressure. The auto-fill valve 180 is energized closed.

With this valve configuration set, advancing the plunger 160 in the direction $D_1$ applies light fluid pressurization to the chambers PC, VC of the power transmission unit 108 to provide a bleed function thereof. More specifically, trapped gases such as air located in the chambers PC, VC is evacuated to the master cylinder 116 by passing through the respective ports 170, 172 and associated de-energized three-way valves 130A, 130B. To this end, the fluid pressure generated by the advancing plunger 160 is sufficient to overcome the check valve 131 in each de-energized three-way valve 130A, 130B. The isolation valves 136A-136D are energized. As a result, unaerated fluid remains in the portion of the circuit shown in bold in FIG. 3. The plunger 160 may be fully stroked to a maximum extent during this step to expel all the brake fluid out of the chambers PC, VC.

Following the power bleed step of FIG. 3, the circuit fill operation transitions the brake system 100 into the state of FIG. 4 for a brake circuit evacuation step. For evacuating a single wheel brake 102A, the transition includes closing (if not previously closed already) the auto-fill valve 180 along with opening the dump valve 138A. At the same time, the three-way valve 130A is actuated to the condition shown in FIG. 4—establishing fluid communication between the pressure chamber PC and the isolation valve 136A. The isolation valves 136A-136D are de-energized. The normally closed DAP valve 132 is actuated open.

Since the auto-fill valve 180 is closed, fluid communication between the now open dump valve 138A and the reservoir 110 is prevented. With this in mind, retracting the plunger 160 in the manner indicated generally at $D_2$ generates a partial vacuum or low pressure space in the fluid channels coupled to the pressure chamber PC of the plunger 160. The vacuum is indicated by the darker dashed lines in FIG. 4.

In the illustrated construction, the vacuum extends from the backside port 174, through the energized three-way valve 130A, through the open isolation valve 136A, through the open dump valve 138A, through the replenishing check valve 140, and to the pressure chamber PC. Consequently, the brake circuit associated with the wheel brake 102A is evacuated.

Once this occurs, the ECU 114 returns the brake system 100 to the configuration shown in FIG. 3 and repeats the power bleed/evacuation operations until the system 100 determines that the brake circuit associated with the wheel brake 102A is sufficiently evacuated. To this end, the ECU 114 can monitor the torque on the electric motor 146 using, for example, a torque sensor connected to both the ECU and the electric motor, and perform the power bleed/evacuation operations in an alternating manner until enough cycles have been performed to drop the pressure within the brake circuit of the wheel brake 102A to a below a predetermined value. To this end, the torque on the motor is indicative of/mathematically related to the brake circuit pressure and, thus, monitoring the motor torque allows the ECU 114 to monitor the brake circuit pressure (or lack thereof). Alternatively, a predetermined number of power bleed/evacuation cycles can be performed based on the volume(s) of the chambers PC, VC relative to the brake circuit volume associated with the particular wheel brake 102A.

Following sufficient evacuation of the wheel brake 102A, the same process can be individually repeated for each of the wheel brakes 102B-102D. In each instance, the specific wheel brake is evacuated and then the power bleed process is performed in a cyclical/alternating manner until the system 100 determines the particular brake circuit(s) is sufficiently evacuated.

Although FIG. 4 illustrates evacuation of a single wheel brake 102A, it will be appreciated that the evacuation can be performed simultaneously on any combination of wheel brakes 102A-102D, including all four wheel brakes, both front wheel brakes, both rear wheel brakes, X-split wheel brakes, etc. That said, operation of the valves associated with the wheel brake(s) to be sequentially or simultaneously evacuated is adjusted accordingly, including energizing or de-energizing the appropriate three-way valves 130A, 130B, isolation valves 136A-136D, and dump valves 138A, 138B. In each case, the chosen combination of wheel brakes goes through the aforementioned power bleed/evacuation cycle until enough cycles are performed to adequately evacuate that particular wheel brake combination. Each wheel brake 102A-102D may require the same number of power bleed/evacuation cycles to reach the desired pressure or the number of cycles can differ between wheel brakes.

It will also be appreciated that instead of cyclically performing the power bleed/evacuation operations multiple times to evacuate one or more wheel brakes 102A-102B, the plunger 160 can alternatively be repeatedly advanced and retracted in a reciprocating manner while the valves remain configured as shown in FIG. 4 to evacuate the chosen wheel brake(s) 102A-102D until the desired evacuation pressure is met. This repeated, reciprocating plunger 160 motion can be employed for each individual wheel brake 102A-102D evacuation, for each selected pair of wheel brake actuation or for evacuating all the wheel brakes simultaneously. In each instance, the plunger 160 acts as a vacuum pump within the power transmission unit 108 and is fully retracted once a particular wheel brake(s) 102A-102D is sufficiently evacuated. The aforementioned power bleed operation is then performed before beginning the next wheel brake(s) evacuation.

In any case, the one-way configuration of the replenishing check valve 140 allows the plunger 160 to draw air/fluid in from the aforementioned circuit each time it retreats (moves rightward as shown) while preventing brake fluid from being pushed back through the replenishing check valve into the circuit each time the piston then advances (moves leftward as shown) before beginning the next retreat stroke.

As shown in FIG. 5, the next step in the circuit fill operation is filling the vacuum chamber VC. In this step, the auto-fill valve 180 is de-energized open. The three-way valves 130A, 130B are de-energized to prevent fluid flow therethrough to the isolation valves 136A-136D. Both of the DAP valves 132, 134 are closed. Thereafter retreating the plunger 160 in the direction $D_2$ draws brake fluid from the reservoir 110 though the open auto-fill valve 180, through the check valve 140, and into the pressure chamber PC.

The plunger 160 can then be advanced in the direction $D_1$ and again retreated in the direction $D_2$ for a number of cycles until sufficient brake fluid is provided within the pressure chamber PC, which can be measured by sensor, theoretically calculated, etc. The check valve 140 and closed DAP valves 132, 134 prevent brake fluid from reaching the wheel brakes 102A-102D or three-way valves 130A, 130B when the plunger 160 is advanced.

Figure 6:
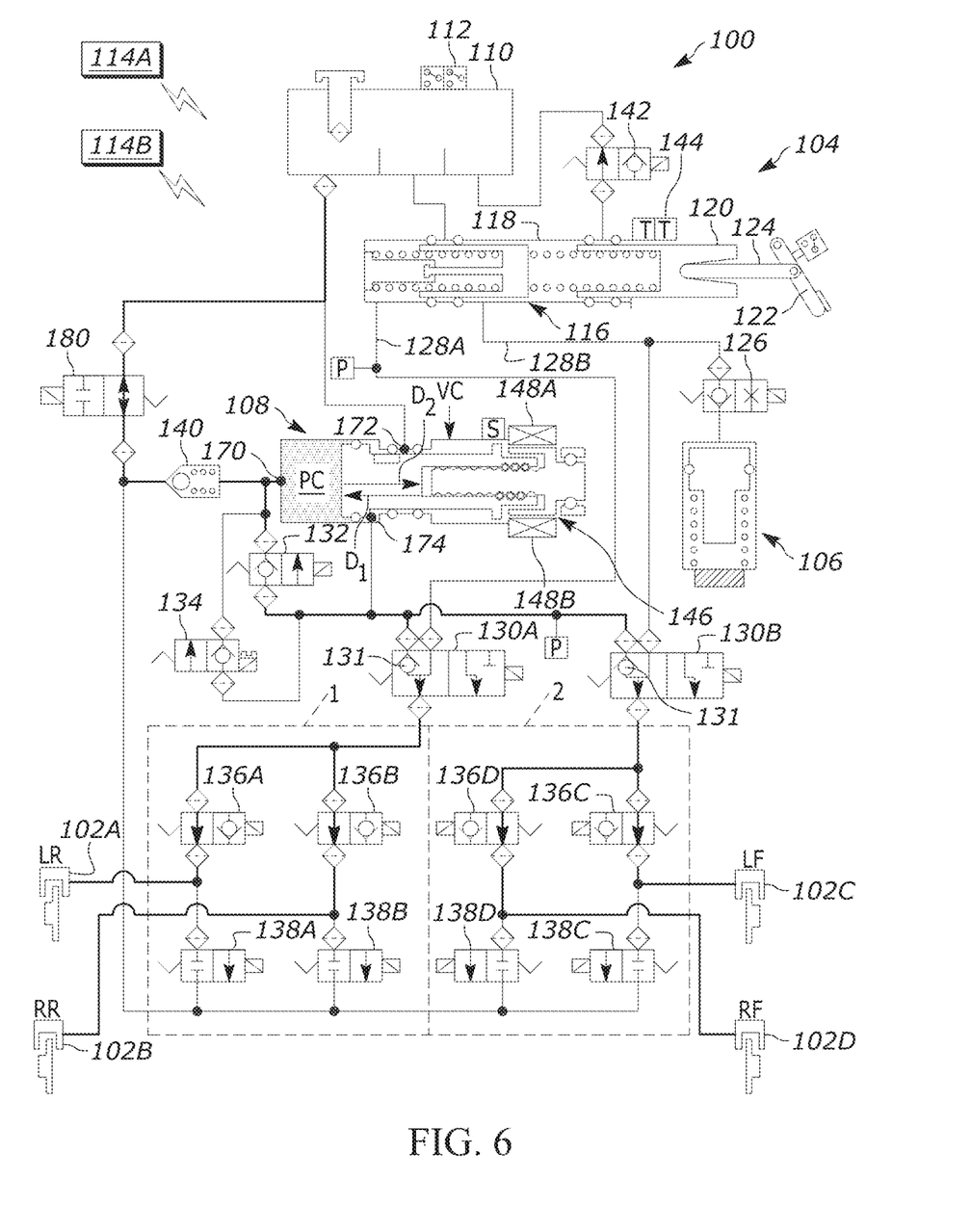
FIG. 6 is a schematic hydraulic diagram of the vehicle brake system during a wheel brake circuit filling operation.

In FIG. 6, the evacuated brake circuits associated with the wheel brakes 102A-102D are filled. To this end, the three-way valves 130A, 130B are actuated to place the isolation valves 136A-136D in fluid communication with the pressure chamber PC. While the auto-fill valve 180 is shown as de-energized open, the auto-fill valve can be open or closed during brake circuit filling.

That said, with the valve configuration of FIG. 6, the plunger 160 is advanced in the direction $D_2$ to simultaneously deliver pressurized brake fluid to all the evacuated brake circuits. Alternatively, each wheel brake 102A-102D can be individually filled. In any case, to ensure sufficient brake circuit filling, once the plunger 160 is fully advanced in the direction $D_2$, the three-way valves 130A, 130B are de-energized while the plunger is retreated in the direction $D_1$ and then re-energized to the configuration shown in FIG. 6 while the plunger is again advanced in the direction $D_1$.

This cyclical advancing and retreating of the plunger 160 while the three-way valves 130A, 130B are controlled accordingly is performed until the system 100 determines the previously evacuated brake circuits are all sufficiently filled. In one example, pressure sensors measure the fluid pressure in the brake circuits and communicate with the ECU 114 such that the ECU cycles the plunger 160 until a predetermined fluid pressure, e.g., about 50 Bar, is reached. The predetermined fluid pressure can coincide with a pressure sufficient to position the brake pads on the wheel brakes 102A-102D at a predetermined distance from the respective rotors (not shown).

Once the brake pads are positioned as desired the three-way valves 130A, 130B are de-energized to re-establish fluid communication between the power transmission unit 108 and the master cylinder 116. The three-way valves 130A, 130B, however, will allow some brake fluid to pop off or pass from the downstream side to the upstream side via the respective check valves 131 in order to release/relief some of the fluid pressure from the wheel brakes 102A-102D. This released brake fluid is passed through the three-way valves 130A, 130B to the fluid lines between the three-way valves and the master cylinder ports 128A, 128B.

The final step of the process involves flushing the master cylinder 116 by first opening the auto-fill valve 180 and retreating the plunger 160 in the direction $D_2$ to fill the pressure chamber PC. During this plunger 160 retreat, the DAP valve 132 is closed and the DAP valve 134 is open. The three-way valves 130A, 130B are actuated open.

Once the retreat is complete, the three-way valves 130A, 130B are de-energized to re-establish fluid communication between the power transmission unit 108 and the master cylinder 116. The three-way valves 130A, 130B, however, will allow some brake fluid to pop off or pass from the outlet 170 to the master cylinder outputs 128A, 128B via check valve 131 when the fluid pressure exceeds about 2.5 Bar. The plunger 160 is then advanced in the direction $D_1$ to force brake fluid through the three-way valves 130A, 130B into the chambers of the master cylinder 116. This plunger 160 retreat and advance cycle is repeated until the system 100 determines the master cylinder 116 has been adequately flushed.

The brake system of the present invention is advantageous in that it allows the plunger of the power transmission unit to be used as a vacuum-generating device capable of evacuating one or more of the wheel cylinders of the vehicle, including allowing all four corners of the system to be simultaneously bled/evacuated and then filled. In this manner, the brake system does not have to complete multiple iterations of the same evacuation process or first ascertain where an air bubble pocket might be.

Rather, once the valves are appropriately open or closed, the plunger is simply moved in a reciprocating or back-and-forth manner, relying on the pressure chamber side of the power transmission unit to evacuate one or up to all the wheel brakes. The evacuated portion of the brake circuit can then be filed by the vacuum chamber side of the power transmission unit, which remains wet during the evacuation step.

Although the brake system 100 as disclosed is capable of full brake-by-wire operation and well adapted to use in full electric drive vehicles, electric hybrid vehicles, and vehicles having powertrains with no/low natural vacuum for a conventional booster, aspects of the invention may provide benefits in a great variety of vehicles including but not limited to those mentioned above.

Figure 7:
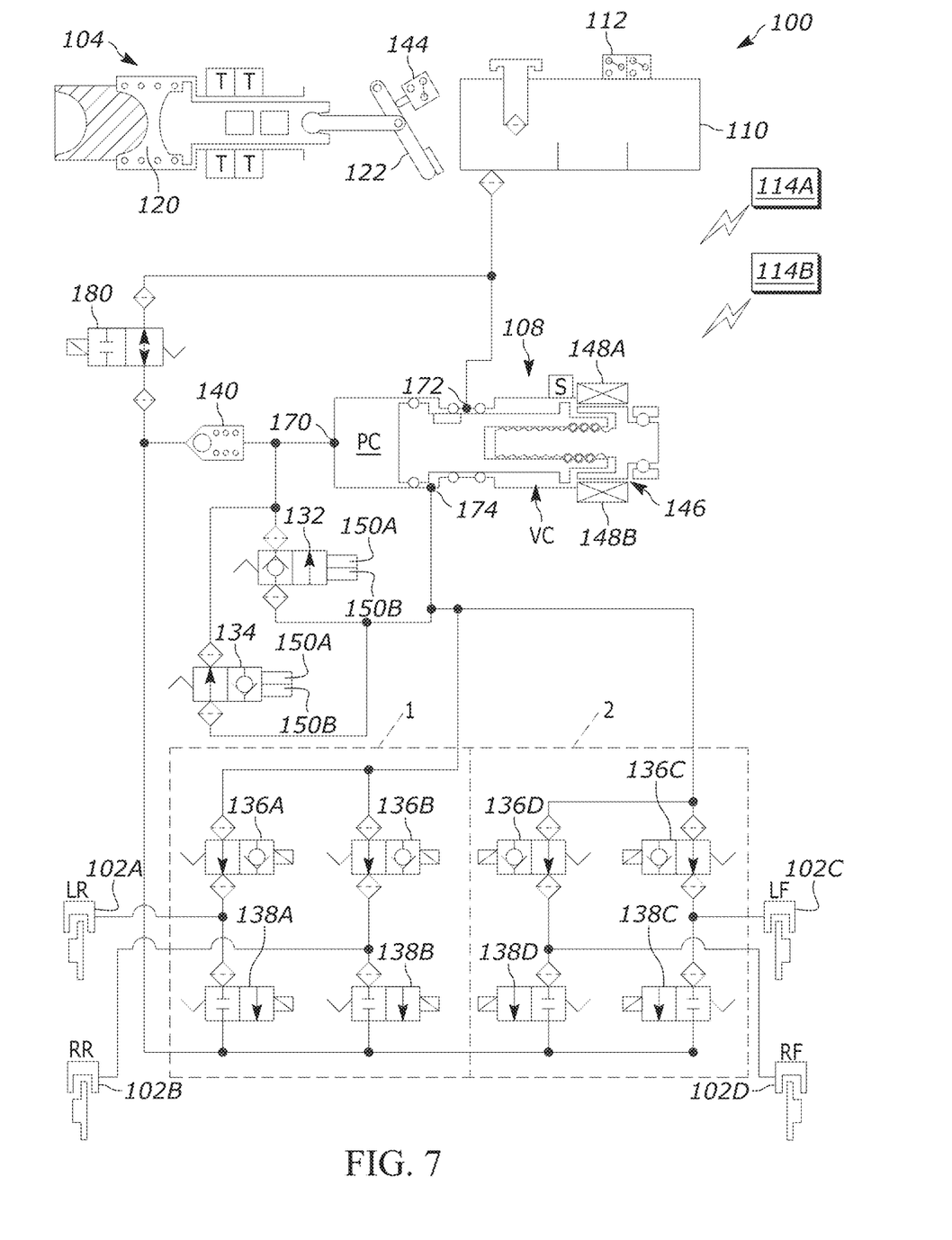
FIG. 7 is a schematic illustration of another example brake system.

With reference now to FIG. 7, a second configuration of the brake system 100 is depicted, parts or all of which can be used with other components of the present invention, as desired. Description of similar components and operation which is made elsewhere in this application will not necessarily be repeated for each and every described configuration or aspect of the brake system 100, for brevity, but should instead be considered to apply to like-numbered portions of other configurations as appropriate.

In the arrangement of the brake system 100 shown in FIG. 7, the brake pedal unit 104 may be remotely located from other structures of the brake system 100, to provide a "brake-by-wire" configuration. Here, the brake pedal unit 104 is of a deceleration signal transmitter type, which provides the braking signal to the ECUs 114A, 114B in a wired or wireless manner exclusively. No manual push-through function is contemplated by the brake system 100 of FIG. 7. Accordingly, the master cylinder 116, three-way valves 130, and the pedal simulator 106 and related structures are omitted from the configuration shown in FIG. 7. It is contemplated that the brake pedal 122 and related structures may also be omitted from the brake system 100 shown in FIG. 7, for a truly autonomous brake arrangement (or simply a manually controlled brake arrangement using hand controls or another non-pedal input).

Again, the brake system 100 of FIG. 7 is substantially similar to that of FIG. 1, though somewhat simpler by virtue of being a "brake-by-wire" type. The brake system 100 of FIG. 7 includes normally closed and normally opened DAP valves 132, 134, isolation and dump valves 136, 138 for each of the wheel brakes 102, and a replenishing check valve 140. Again, first and second ECUs 114A, 114B are provided, with each ECU 114 controlling a respective one of the first and second windings 148A, 148B of the electric motor 146 of the DAP-type power transmission unit 108.

Also as referenced with respect to the brake system 100 of FIG. 1, the brake system 100 of FIG. 7 may include single- or dual-wound type normally closed and normally opened DAP valves 132, 134, isolation valves 136, and/or dump valves 138. As explicitly shown in FIG. 7, the normally closed and normally opened DAP valves 132, 134 are of the dual-winding type, with first windings 150A of each valve being controlled by the first ECU 114A and second windings 150B of each valve being cool controlled by the second ECU 114B.

In the brake systems 100 shown in both of FIGS. 1 and 6, redundancy is provided in the system through the use of one or more ECUs 114A, 114B, dual windings 148A, 148B of the electric motor 146 of the power transmission unit 108, and/or dual windings 150A, 150B of one or more of the system valves of the brake system 100. One of ordinary skill in the art can readily configure a brake system 100 according to the principles disclosed and taught herein for a particular use environment, as desired.

Figure 8:
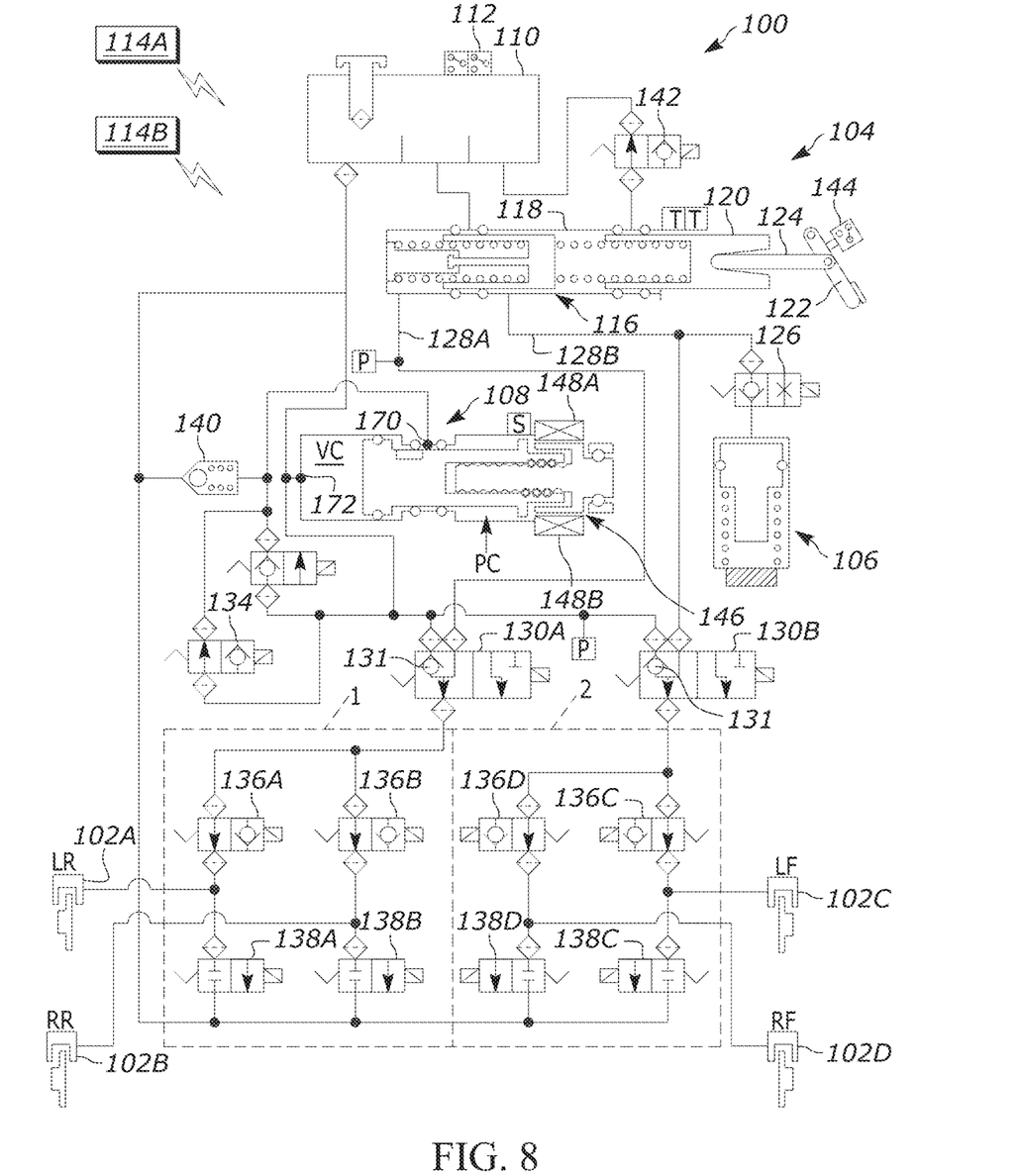
FIG. 8 is a schematic illustration of yet another example brake system.

With that said, the same bleed, evacuation, and fill steps outlined for the brake system of FIG. 1 can be adapted to perform the same functions for the brake system of FIG. 7. More specifically, all four wheel brakes 102A-102B in the brake system 100 of FIG. 7 can be simultaneously bled/evacuated using the pressure chamber PC of the power transmission unit 108 and then filled using the wet vacuum chamber VC. In another example brake system shown in FIG. 8, the power transmission unit 108 is configured to reverse the locations of the chambers PC, VC. In particular, port 170 fluidly connected to the replenishing valve 140 is positioned to the right (as shown) of the seal 164. The port 172 fluidly connected to the reservoir 110 and three-way valves 130 is positioned to the left (as shown) of the seal 164.

What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. A method of operating a vehicle brake system having multiple wheel brakes, the method comprising:
    providing a plunger assembly having a plunger and a chamber fluidly connected to at least one of the wheel brakes;
    performing an evacuation of at least one of the wheel brakes by moving the plunger relative to the chamber under control of an electronic control unit (ECU) to generate a vacuum from the chamber to the at least one wheel brake; the evacuation comprising:
        a) advancing the plunger to exhaust a flow path between the plunger assembly and a master cylinder and through a three-way valve in a first condition;
        b) retracting the plunger while the three-way valve is in a second condition; and
        c) repeating steps a) and b) in an alternating manner until the at least one wheel brake falls below a predetermined pressure; and
    supplying pressurized brake fluid from a reservoir to the evacuated wheel brakes by moving the plunger relative to the chamber under control of the ECU once all the wheel brakes are evacuated.

2. The method of claim 1, wherein the advancing and retracting steps are repeated until a sensed torque on a motor actuating the plunger is sufficiently high to indicate sufficient vacuum has been achieved.

3. The method of claim 1, wherein the advancing and retracting steps are repeated until a predetermined volume of air has been evacuated.

4. The method of claim 1, wherein all the wheel brakes on the vehicle are simultaneously evacuated by retracting the plunger.

5. The method of claim 1, wherein all the wheel brakes on the vehicle are individually evacuated by retracting the plunger for each wheel brake.

6. The method of claim 1 further comprising:
    providing the plunger assembly configured as a dual acting plunger and defining a first chamber in fluid communication with a reservoir filled with brake fluid and in which the chamber connected to the wheel brakes defines a second chamber;
    placing a dump valve associated with each wheel brake in an open condition to place each wheel brake in fluid communication with the first chamber;
    placing an auto-fill valve positioned between the reservoir and the first chamber and between the dump valves and the reservoir in a closed condition to prevent fluid communication between the first chamber and the reservoir; and
    moving the plunger in the alternating manner multiple times to simultaneously evacuate all the wheel brakes.

7. The method of claim 6, further comprising:
    placing the dump valves in a closed condition;
    placing the auto-fill valve in an open condition;
    moving the plunger towards the second chamber to supply brake fluid from the second chamber into the evacuated wheel brakes.

8. The method of claim 6, further comprising placing isolation valves associated with each wheel brake in a closed condition prior to movement of the plunger in the alternating manner to prevent fluid communication between the second chamber and the wheel brakes.

9. The method of claim 6, wherein the first chamber defines a pressure chamber and the second chamber defines a vacuum chamber.

10. The method of claim 6, wherein the first chamber defines a vacuum chamber and the second chamber defines a pressure chamber.

11. The method of claim 6, further comprising positioning the auto-fill valve between the dump valves and the reservoir.

12. The method of claim 11, further comprising positioning a check valve between the auto-fill valve between the dump valve and the first chamber.

13. The method of claim 6, wherein the plunger is fully stroked in an advancing direction during the alternating motion.

14. A method of operating a vehicle brake system having multiple wheel brakes, the method comprising:
    providing a plunger assembly having a plunger and a chamber fluidly connected to at least one of the wheel brakes;
    performing an evacuation of at least one of the wheel brakes by moving the plunger relative to the chamber under control of an electronic control unit (ECU) to generate a vacuum from the chamber to the at least one wheel brake, wherein performing the evacuation comprises:
        a) advancing the plunger to exhaust a flow path between the plunger assembly and a master cylinder and through a three-way valve in a first condition; and then
        b) retracting and advancing the plunger multiple times in an alternating manner while the three-way valve is in a second condition until the at least one wheel brake falls below a predetermined pressure; and
    supplying pressurized brake fluid from a reservoir to the evacuated wheel brakes by moving the plunger relative to the chamber under control of the ECU once all the wheel brakes are evacuated.

15. The method of claim 14, wherein the advancing and retracting steps are repeated until a sensed torque on a motor actuating the plunger is sufficiently high to indicate sufficient vacuum has been achieved.

16. The method of claim 14, wherein the advancing and retracting steps are repeated until a predetermined volume of air has been evacuated.

17. The method of claim 14, wherein all the wheel brakes on the vehicle are simultaneously evacuated by retracting the plunger.

18. The method of claim 14, wherein all the wheel brakes on the vehicle are individually evacuated by retracting the plunger for each wheel brake.

* * * * *